United States Patent
Sham

(10) Patent No.: US 7,310,852 B2
(45) Date of Patent: Dec. 25, 2007

(54) VALVE ASSEMBLY

(75) Inventor: John C. K. Sham, Hong Kong (CN)

(73) Assignee: GT Investments (BVI) Limited, Road Town, Tortola (VG)

( * ) Notice: Subject to any disclaimer, the term of this patent is extended or adjusted under 35 U.S.C. 154(b) by 750 days.

(21) Appl. No.: 10/757,006

(22) Filed: Jan. 14, 2004

(65) Prior Publication Data

US 2005/0150073 A1    Jul. 14, 2005

(51) Int. Cl.
*A47L 7/00* (2006.01)
*F16K 11/00* (2006.01)

(52) U.S. Cl. .......................... 15/320; 15/321; 137/202

(58) Field of Classification Search ................. 15/320, 15/321; 137/114, 202, 597
See application file for complete search history.

(56) References Cited

U.S. PATENT DOCUMENTS

| | | | |
|---|---|---|---|
| 2,955,609 A * | 10/1960 | Gaubatz | 137/114 |
| 3,410,295 A * | 11/1968 | Malott | 137/114 |
| 4,534,083 A * | 8/1985 | Hampson | 15/321 |
| 4,570,657 A | 2/1986 | Rogers | 137/39 |
| 4,611,627 A | 9/1986 | Eidsvoog et al. | 137/588 |
| 4,951,701 A | 8/1990 | Boehmer | 137/199 |
| 5,549,134 A | 8/1996 | Browne et al. | 137/606 |
| 5,632,299 A * | 5/1997 | Weinhold | 137/111 |
| 5,782,262 A * | 7/1998 | Kim | 137/202 |
| 5,937,475 A | 8/1999 | Kasen et al. | 15/320 |
| 6,073,300 A | 6/2000 | Zahuranec et al. | 15/320 |
| 6,158,081 A | 12/2000 | Kasen et al. | 15/320 |
| 6,266,436 B1 | 7/2001 | Bett et al. | 417/388 |
| 6,583,525 B2 * | 6/2003 | Dyer et al. | 310/53 |
| 2001/0000830 A1 * | 5/2001 | Kasper et al. | 15/320 |

* cited by examiner

*Primary Examiner*—Theresa T. Sinder
(74) *Attorney, Agent, or Firm*—Peter S. Canelias

(57) ABSTRACT

The invention relates to a valve assembly for use in connection with carpet cleaning extraction machines and similar extraction cleaning devices. The invention allows the intake of liquid and the mixing of different liquids in a mixing chamber, such as clean water with detergent, and the discharge of a selected liquid without the formation of an air or vapor lock that would inhibit the discharge of the selected liquid. In particular, the invention prevents the formation of a vapor lock when water is being drawn into a chamber that would prevent the subsequent discharge or spraying of the liquid.

37 Claims, 3 Drawing Sheets

VALVE ASSEMBLY

BACKGROUND OF THE INVENTION

The invention relates to a valve assembly for use in connection with carpet cleaning extraction machines. The invention allows the mixing of different liquids in a mixing chamber, such as clean water with detergent, and the discharge of a selected liquid without the formation of a vapor lock that would inhibit the discharge of the selected liquid. In particular, the invention prevents the formation of a vapor lock when water is being drawn into a chamber that would prevent the subsequent discharge or spraying of either water or a water/detergent mixture.

Carpet cleaning machines of the extraction type are typically used to inject water or a water/detergent mixture into the carpet fibers to be cleaned. The machine then typically extracts the soiled water/detergent mixture by vacuuming, thereby extracting particulate matter and other soiling agents and contaminants from the carpet along with the water and detergent. Examples of such carpet cleaning extraction-type machines include U.S. Pat. No. 6,158,081 to Kasen et al., titled Water Extraction Cleaning Machine with Variable Solution Mixing Valve, incorporated by reference herein for all purpose. The valve of the Kaspen et al. invention allows different mixes of detergent and water to be adjusted by a knob. U.S. Pat. No. 6,073,300 to Zahuranec et al., titled Valve Assembly for Carpet Extractor, incorporated by reference herein for all purposes, is directed to a spray valve assembly for a carpet extractor which provides ease of coupling of a remote attachment for access to hard to reach areas and selective supply of cleaning solution to the attachment and the floor. Extraction cleaning machines are well known in the art, and it is submitted that the valve assembly of the present invention is particularly useful in machines of this type.

Predicate to spraying either water or a water/detergent mixture, each liquid must be drawn into a compartment from their respective holding tanks. Water is typically drawn in first, before the typically more viscous detergent. It is at this initial stage of drawing water into a chamber from a tank or reservoir that a problem frequently occurs that impedes operation of the device. The chamber that water is drawn into is usually air-filled immediately prior to the water entering from its holding tank or reservoir. As water enters the air-filled chamber, insufficient pressure is generated to force a valve (typically a shut-off plunger rod assembly) into the closed position. Consequently, an air or vapor lock forms within the chamber, thereby preventing the ultimate discharge of the liquid. The invention solves this problem by creating an air release, discharging the air in a single direction and destroying the air lock. Destroying the air lock permits the discharge of a selected liquid though a discharge outlet.

In the extraction cleaner application, the vapor lock problem is most acute where the water tank is located in the lower part of the extractor, where the water level is low and thus the gravity-induced pressure is even more likely to be insufficient to overcome the vapor lock. Thus, the invention allows a greater diversity of positions to locate the water tank, without incurring an air lock problem. This allows much greater flexibility in the design of extraction cleaners.

BRIEF SUMMARY OF THE INVENTION

The present invention is a valve assembly that, in its preferred embodiment, allows water to enter in two directions into the valve assembly. A first stream enters into the middle mixing cavity and then travels to a left cavity. The left cavity is in fluid communication with a bleeder tube body so that water entering the left cavity will migrate to the bleeder tube body, and force air within the bleeder tube body to be exhausted. Meanwhile, a second stream of water that enters into the mixing chamber impels or urges a valve in the direction of the left cavity, enabling the air within the mixing chamber to pass through to the left cavity, and finally to be exhausted out from the exhaust port opening.

The problem of an air or vapor lock occurs at start up, when liquid is drawn into a chamber containing air. Once the chamber is filled with fluid and the air expelled, the vapor lock problem no longer exists. Therefore it is an object of the invention to overcome this initial vapor lock problem and allow the discharge of liquid from the chamber.

It is an object of this invention to provide a valve assembly that counteracts the formation of a vapor lock as fluid is drawn into an air-containing chamber.

It is a further object of this invention to provide a valve assembly that is adaptable to a variety of chambers having different volumes and shapes.

It is a further object of this invention to provide a valve assembly specifically adapted for use in an injection/extraction type cleaning machine.

It is a further object of this invention to provide a valve assembly that allows greater flexibility in the location of liquid holding tanks in an extraction cleaner.

It is a further object of the invention to provide a valve assembly that is reliable, and may be easily maintained.

Other objects and advantages will be more fully apparent from the following disclosure and appended claims.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION

Figure 1:
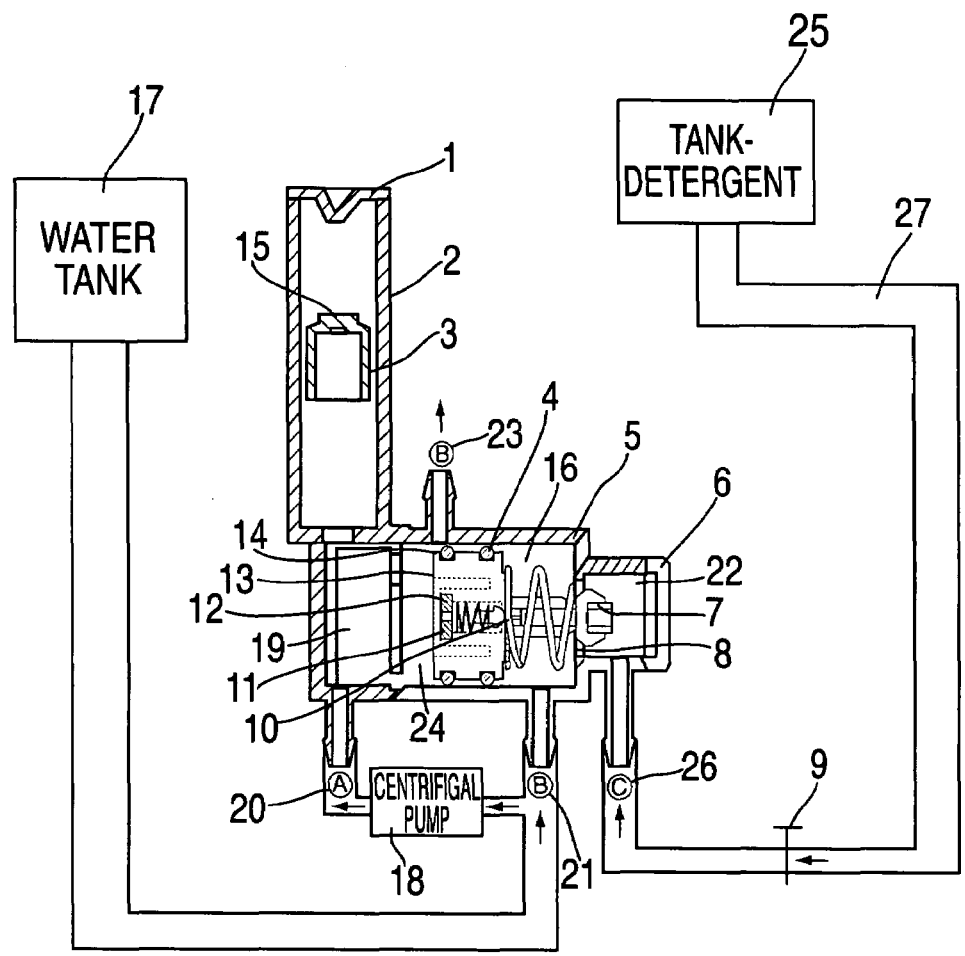
FIG. 1 is a section view of a preferred embodiment of the invention.

FIG. 1 shows a preferred embodiment of the valve assembly of the present invention with the valve assembly in the relaxed position. The valve assembly encompasses a number of constituent parts, including a cap-bleeder (1); a bleeder tube body (2); a float-bleeder (3); a first actuator O-ring (4); a shut-off valve body (5); a shut-off valve cover (6); an O-ring (7); a spring (8); a detergent valve (9); a valve (10); a valve cover (11); a second spring (12); a shut-off plunger rod, also denominated as an actuator; (13); a second actuator O-ring (14); a shut-off plunger assembly (15).

A mixing chamber (16) as shown in FIG. 1 is an exemplar of mixing chambers of the type commonly used in extraction-type cleaners. However, other configurations, shapes, volumes or sizes may be employed without departing from the teachings of the present invention.

The positioning of the certain elements affects the performance of the preferred embodiment as follows. Referring to FIG. 1, the water level in the water tank (17) must be higher than the level in the bleeder tube body (2). In other words, the placement of the water tank (17) within an extraction cleaner or similar device should be higher than the mixing chamber (16) in order to generate sufficient pressure for the invention to operate properly.

Figure 3:
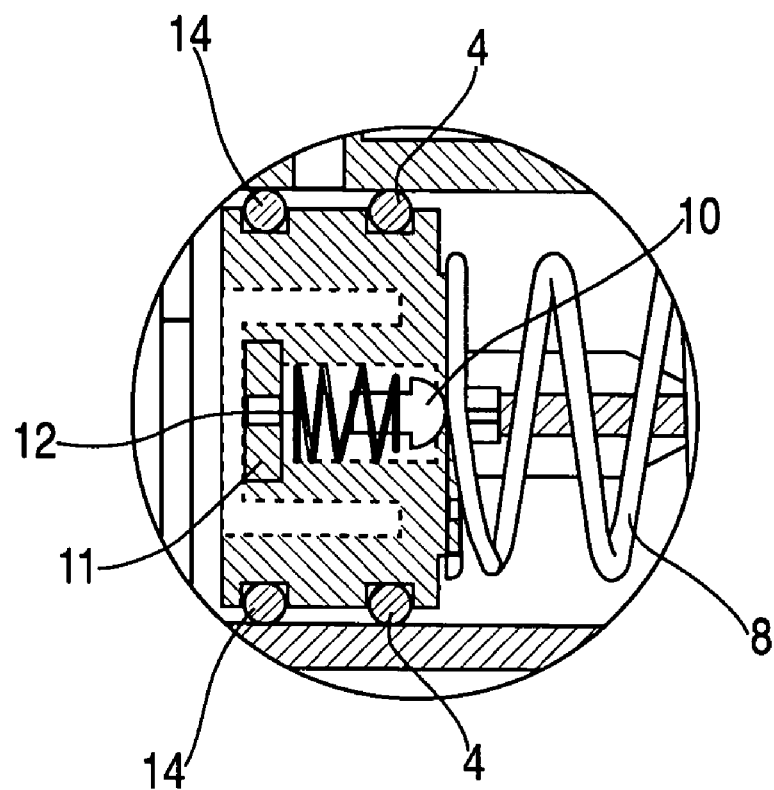
FIG. 3 is a section view of the valve component of the present invention.

As shown in FIG. 1, water is pumped from the water tank (17) through the centrifugal pump (18), and into the left chamber (19) though inlet/outlet (20). The water enters the assembly in two directions. The first stream enters into the middle mixing cavity (16) through inlet (21). The stream then travels to the left cavity (19) though the centrifugal pump (18) and to inlet (20). The left cavity (19) is in fluid communication with the bleeder tube body (2), so that water entering the left cavity (19) will migrate to the bleeder tube body (2). When the first water stream begins to fill the bleeder tube body (2) the air within the bleeder tube body (2) will be exhausted from an opening (an exhaust port) (not shown) located in the cap-bleeder (1). Meanwhile, the second stream of water that enters into the mixing chamber (16) impels or urges the valve (10) together with the spring (12) in the direction of the left cavity (19) as shown in FIGS. 1 and 3, enabling the air within the mixing chamber (16) to pass through to the left cavity (19), and finally to be exhausted out from the exhaust port opening at the cap bleeder (1).

Water from the two streams continues to fill both the left cavity (19) and the mixing chamber (16). As water continues to fill the left cavity (19), water enters the bleeder tube body (2) and causes the float bleeder (3) to be raised along with the water level in the bleeder tube body (2). The float bleeder (3) rises through the upper end of the bleeder tube body (2) until reaching the top. At the top, the float bleeder (3) seals the exhaust port at the cap-bleeder (1).

Figure 2:
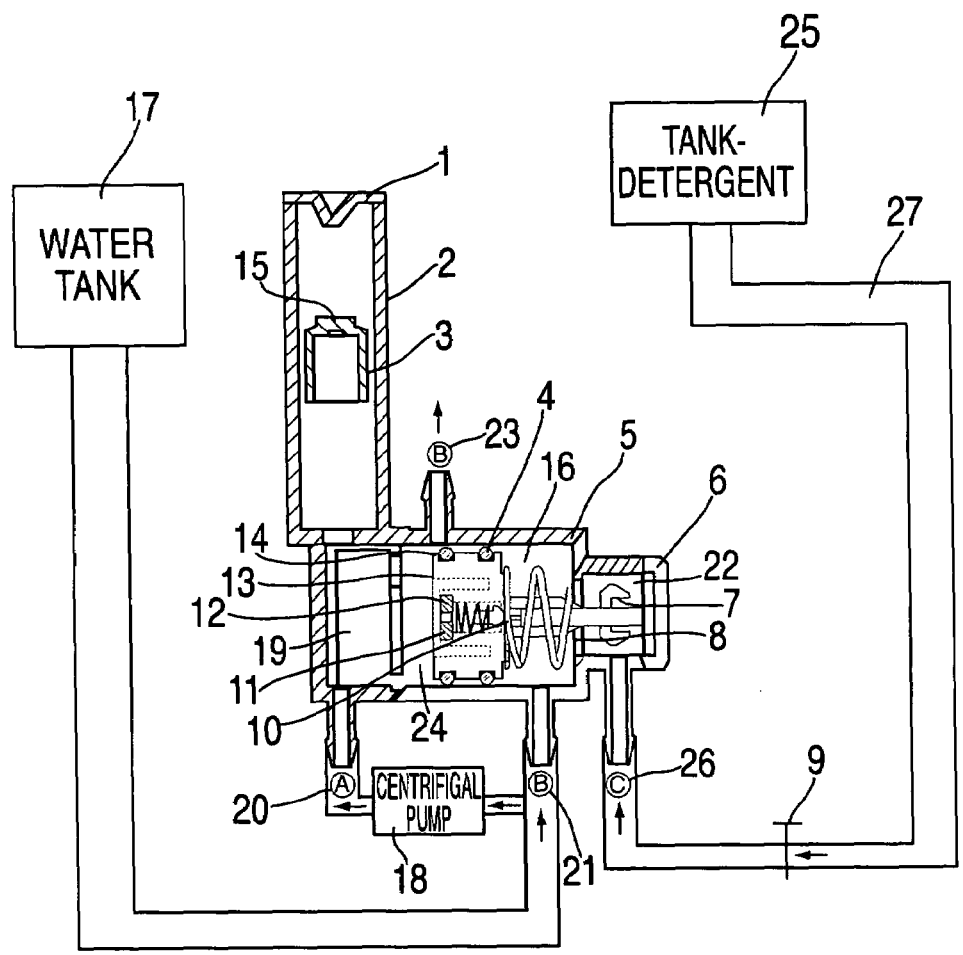
FIG. 2 is a section view of a preferred embodiment of the invention with valve in a compressed position.

Turning now to FIG. 2, the sealing of the exhaust port at the cap-bleeder (1) creates an enclosed environment for operation of the valve assembly. The shut-off plunger rod (13) is slidably engaged between the left cavity (19) and the mixing chamber (16). The first actuator O-ring (4) and the second actuator O-ring (14), seal the space between the plunger rod (13) and the inner surface of the mixing chamber (16) and the inner surface of the left cavity (19), thereby preventing liquid from passing over the shut-off plunger rod (13) from the left cavity (19) to the mixing chamber (16) and vice versa. Once the exhaust port is sealed, water pressure within the left cavity (19) begins to rise, and when the water pressure within the left cavity (19) reaches a predetermined level, the pressure induces the shut-off plunger rod (13) to move towards the right cavity (22), thereby compressing the spring (8) as the shut-off plunger rod (13) is impelled towards the right cavity (22). The movement of the shut-off plunger rod (13) creates a space (24) that ultimately enables water to be discharged or sprayed from outlet (23). As the shut-off plunger rod (13) moves towards the right cavity (22), the O-ring (7) will be impelled towards the right cavity (22), enabling the detergent from the detergent tank (25) that passes though the detergent valve (9) to enter into the right cavity (22) from inlet (26) and into the mixing chamber (16). Upon the entry of detergent into the mixing chamber, the process of mixing water and detergent commences.

As shown in FIG. 2, where the shut-off plunger rod (13) moves towards the right cavity (22), the spring (8) is in the compressed position. When a mixture of water and detergent is selected to be sprayed, the clean water path is activated. When the shut-off plunger rod (13) is impelled towards the right cavity (22), the O-ring (7), which is used to seal the area between the right cavity (22) and the mixing chamber (16), will be impelled towards the right cavity (22). As the O-ring (7) traverses the right cavity (22), the seal between the mixing chamber (16) and the right cavity (22) is disengaged, enabling the mixture of water and detergent in the mixing chamber (16).

The detergent is held in the detergent tank (25), and travels though a tube (27) from the detergent tank (25) into the right cavity (22) through inlet (26). Since the seal between the mixing chamber (16) and the right cavity (22) is disengaged by movement of the O-ring (7), the detergent can flow from the right cavity (22) into the mixing chamber (16), and then continue into the centrifugal pump (18) though inlet/outlet (21). Since both the water and detergent are now going into the pump (18), the mixing process continues and is enhanced in the area immediately before entrance to the centrifugal pump (18). Eventually, the water/detergent mixture will enter into the left cavity (19) through inlet (20), creating additional pressure to force the shut-off plunger rod (13) towards the right cavity (22), and may be sprayed though outlet (23).

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. A valve assembly comprising:
    a first chamber having a first inlet port for a first liquid;
    a second chamber having a second inlet port for a second liquid;
    an intermediate chamber positioned adjacent said first chamber and said second chamber;
    a bleeder having an exhaust port in fluid communication with said first chamber;
    an actuator located between said first chamber and said second chamber and slidably engaged within said intermediate chamber to move from a first position to a second position;
    said actuator bearing a valve;
    said first liquid creating pressure to urge said actuator towards said second position, and to urge said valve to an exhaust position, allowing air within said intermediate chamber to exit said intermediate chamber.

2. The valve assembly of claim 1, wherein said valve is operably engaged with a biasing member.

3. The valve assembly of claim 2, wherein said biasing member is a coil spring.

4. The valve of claim 1, wherein said bleeder assembly comprises a bleeder tube body and a cap bleeder.

5. The valve assembly of claim 4, wherein said bleeder tube body contains a float bleeder for sealing and unsealing said exhaust port.

6. The valve assembly of claim 1, wherein said first liquid is comprised of water, and said second liquid is comprised of a detergent.

7. The valve assembly of claim 1, wherein said actuator is a plunger rod.

8. The valve assembly of claim 7, wherein said plunger rod is operably engaged with a plunger rod biasing member.

9. The valve assembly of claim 8, wherein said plunger rod biasing member is a coil spring.

10. The valve assembly of claim 1, further comprising a discharge port to enable discharge spray of a mixture of said first liquid and said second liquid from said intermediate chamber.

11. The valve assembly of claim 1, further comprising a sealing member operably coupled with said actuator for moving to a selected position to allow said second liquid to enter said second chamber.

12. The valve assembly of claim 11, wherein said sealing member is an o-ring.

13. A valve assembly comprising:
a first chamber having a first inlet port for a first liquid;
a second chamber having a second inlet port for a second liquid;
an intermediate chamber positioned adjacent said first chamber and said second chamber;
a bleeder having an exhaust port in fluid communication with said first chamber;
an actuator located between said first chamber and said second chamber and slidably engaged within said intermediate chamber to move from a first position to a second position;
said actuator bearing a valve;
a pump for pumping said first liquid into said first chamber and for pumping a mixture of said first liquid with said second liquid;
said pump in fluid communication with said first chamber and said intermediate chamber;
said first liquid creating pressure to urge said actuator towards said second position, and to urge said valve to an exhaust position, allowing air within said intermediate chamber to exit said intermediate chamber;
said actuator bearing a sealing means for engaging and disengaging a seal between said intermediate chamber and said second chamber;
said second liquid entering said intermediate chamber upon disengagement of said seal between said intermediate chamber and said second chamber.

14. The valve assembly of claim 13, wherein said sealing means is an o-ring.

15. The valve assembly of claim 13, wherein said valve is operably engaged with a biasing member.

16. The valve assembly of claim 15, wherein said biasing member is a coil spring.

17. The valve of claim 13, wherein said bleeder assembly comprises a bleeder tube body and a cap bleeder.

18. The valve assembly of claim 17, wherein said bleeder tube body contains a float bleeder for sealing and unsealing said exhaust port.

19. The valve assembly of claim 13, wherein said first liquid is comprised of water, and said second liquid is comprised of a detergent.

20. The valve assembly of claim 13, wherein said actuator is a plunger rod.

21. The valve assembly of claim 20, wherein said plunger rod is operably engaged with a plunger rod biasing member.

22. The valve assembly of claim 21, wherein said plunger rod biasing member is a coil spring.

23. The valve assembly of claim 13, further comprising a discharge port to enable discharge spray of a mixture of said first liquid and said second liquid from said intermediate chamber.

24. The valve assembly of claim 13, further comprising a sealing member operably coupled with said actuator for moving to a selected position to allow said second liquid to enter said second chamber.

25. The valve assembly of claim 24, wherein said sealing member is an o-ring.

26. An extraction cleaner comprising:
a first tank for containing a first liquid;
a second tank for containing a second liquid;
a dispensing port for spraying a mixture of said first liquid and said second liquid;
said dispensing port in fluid communication with a valve assembly;
said valve assembly in fluid communication with said first tank and with said second tank, and comprising:
a first chamber having a first inlet port for said first liquid;
a second chamber having a second inlet port for said second liquid;
an intermediate chamber positioned adjacent said first chamber and said second chamber;
a bleeder having an exhaust port in fluid communication with said first chamber;
an actuator located between said first chamber and said second chamber and slidably engaged within said intermediate chamber to move from a first position to a second position;
said actuator bearing a valve;
said first liquid creating pressure to urge said actuator towards said second position, and to urge said valve to an exhaust position, allowing air within said intermediate chamber to exit said intermediate chamber.

27. The extraction cleaner of claim 26, wherein said valve is operably engaged with a biasing member.

28. The extraction cleaner of claim 27, wherein said biasing member is a coil spring.

29. The extraction cleaner of claim 26, wherein said bleeder comprises a bleeder tube body and a cap bleeder.

30. The extraction cleaner of claim 29, wherein said bleeder tube body contains a float bleeder for sealing and unsealing said exhaust port.

31. The extraction cleaner of claim 26, wherein said first liquid is comprised of water, and said second liquid is comprised of a detergent.

32. The extraction cleaner of claim 26, wherein said actuator is a plunger rod.

33. The extraction cleaner of claim 32, wherein said plunger rod is operably engaged with a plunger rod biasing member.

34. The extraction cleaner of claim 33, wherein said plunger rod biasing member is a coil spring.

35. The extraction cleaner of claim 26, further comprising a discharge port to enable discharge spray of a mixture of said first liquid and said second liquid from said intermediate chamber.

36. The extraction cleaner of claim 26, further comprising a sealing member operably coupled with said actuator for moving to a selected position to allow said second liquid to enter said second chamber.

37. The extraction cleaner of claim 36, wherein said sealing member is an o-ring.

* * * * *